US007983478B2

(12) United States Patent
Liu et al.

(10) Patent No.: US 7,983,478 B2
(45) Date of Patent: Jul. 19, 2011

(54) HIDDEN MARKOV MODEL BASED HANDWRITING/CALLIGRAPHY GENERATION

(75) Inventors: Peng Liu, Beijing (CN); Yi-Jian Wu, Beijing (CN); Lei Ma, Beijing (CN); Frank Kao-PingK Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 11/837,434

(22) Filed: Aug. 10, 2007

(65) Prior Publication Data

US 2009/0041354 A1 Feb. 12, 2009

(51) Int. Cl.
G06K 9/62 (2006.01)
(52) U.S. Cl. ............... 382/161; 382/186; 382/187
(58) Field of Classification Search .............. None
See application file for complete search history.

(56) References Cited

U.S. PATENT DOCUMENTS

| | | | |
|---|---|---|---|
| 5,459,809 A * | 10/1995 | Kim et al. ............ | 382/160 |
| 5,588,073 A | 12/1996 | Lee et al. | |
| 5,636,291 A | 6/1997 | Bellegarda et al. | |
| 5,644,652 A | 7/1997 | Bellegarda et al. | |
| 5,768,423 A | 6/1998 | Aref et al. | |
| 5,812,698 A | 9/1998 | Platt et al. | |
| 5,854,855 A | 12/1998 | Errico et al. | |
| 5,920,647 A | 7/1999 | Nowlan et al. | |
| 6,084,985 A | 7/2000 | Dolfing et al. | |
| 6,956,969 B2 | 10/2005 | Loudon et al. | |
| 7,054,510 B1 | 5/2006 | Milner | |
| 7,227,993 B2 | 6/2007 | Xu et al. | |
| 7,697,002 B2 * | 4/2010 | McCall et al. ............ | 345/467 |
| 2004/0148577 A1 | 7/2004 | Xu et al. | |

OTHER PUBLICATIONS

Chen, et al., "Off-Line Handwritten Word Recognition Using a Hidden Markov Model Type Stochastic Network", available at least as early as May 4, 2007, at <<http://ieeexplore.ieee.org/iel1/34/7215/00291449.pdf?isNumber= >>, IEEE, vol. 16, No. 5, May 1994, pp. 481-496.

Makhoul, et al., On-Line Cursive Handwriting Recognition Using Hidden Markov Models and Statistical Grammars, available at least as early as May 4, 2007, at <<http://delivery.acm.org/10.1145/1080000/1075912/p432-makhoul.pdf?key1=1075912&key2=6459528711&coll=GUIDE&dl=GUIDE&CFID=17929888&CFTOKEN=43573113>>, pp. 432-436.

Tokuno, et al., "Context-Dependent Substroke Model for HMM-based On-line Handwriting Recognition", availbale at least as early as May 4, 2007, at <<http://www.cstr.ed.ac.uk/downloads/publications/2002/Tokuno2002IWFHR.pdf>>, IWFHR, Aug. 2002, pp. 78-83.

PCT Search Report for PCT Application No. PCT/US2008/072833, mailed Jan. 29, 2009 (10 pages).

Sin, "An HMM-based Statistical Framework For Modeling On-line Cursive Script", PhD thesis, Korea Advanced Institute of Science & Technology, Feb. 1995, 197 pages.

Sin, et al., "Hangul Character Generation using Hidden Markov Models", Journal(B) of Korean Institue of Information Scientists and Engineers, Jan. 1997, vol. 24, No. 1, 11 pages.

* cited by examiner

*Primary Examiner* — Brian Werner
(74) *Attorney, Agent, or Firm* — Lee & Hayes, PLLC (57) ABSTRACT

An exemplary method for handwritten character generation includes receiving one or more characters and, for the one or more received characters, generating handwritten characters using Hidden Markov Models trained for generating handwritten characters. In such a method the trained Hidden Markov Models can be adapted using a technique such as a maximum a posterior technique, a maximum likelihood linear regression technique or an Eigen-space technique.

19 Claims, 9 Drawing Sheets

FIG. 1

Constructing Eastern Asian Characters
200

FIG. 2

MODELING FEATURES FOR CHARACTER AND STYLE RECOGNITION
250

EXAMPLES OF GENERATED AND RENDERED EASTERN ASIAN CHARACTERS
800

HIDDEN MARKOV MODEL BASED HANDWRITING/CALLIGRAPHY GENERATION

BACKGROUND

Handwriting and/or calligraphy generation, which mimics a real pen trajectory of personalized or artistic handwritten characters, is becoming more and more popular in entertainment or computer graphics. Systems that generate such style elements differ from conventional systems that simply print or display a standard font. A brief overview of conventional systems follows, which helps to highlight challenges that exist for handwriting and/or calligraphy generation.

Many types of input devices exist to enter text or handwriting. For example, a conventional computer keyboard is an input device that generates signals as a key or combination of keys is actuated. A chip inside the computer receives the signal bits and decodes them into the appropriate keypress. The computer then decides what to do on the basis of the key pressed (e.g. display a character on the screen or perform some action). The displayed character is conventionally displayed according to a typeface or font. For example, a word processing program may include fonts such as Arial, Time New Roman, etc.

In typography, a typeface is a coordinated set of glyphs designed with stylistic unity. A typeface usually comprises an alphabet of letters, numerals, and punctuation marks; it may also include ideograms and symbols, or consist entirely of them, for example, mathematical or map-making symbols. The term typeface is often conflated with font, a term which, historically, had a number of distinct meanings before the advent of desktop publishing; these terms are now effectively synonymous when discussing digital typography. One notable and still-valid distinction between font and typeface is a font's status as a discrete commodity, while typeface designates a visual appearance or style.

The art and craft of designing typefaces is called type design. Designers of typefaces are called type designers, and often typographers. In digital typography, type designers are also known as font developers or font designers.

Whether a user enters a character through a keyboard, a pen/tablet, voice recognition, etc., for conventional systems, the end result is dictated by the selected font, which has a one-to-one correspondence to the character entered. For example, while a person may enter characters in cursive using a pen on a tablet, the best "cursive" result a conventional handwriting recognition and generating system can achieve is through a cursive font that has no regard for character order, spacing, etc. In other words, the output is stripped of expression. While a user may arguably apply an italicized style to certain fonts for emphasis (or underlining or bold), the end result still lacks expression found in human handwriting.

With respect to expression, a person can express anger by using stiff, angled, high pressure strokes or a person can express joy by using looping, expansive, low pressure strokes. Indeed, the field of graphology is dedicated to the study and analysis of such characteristics, especially in relationship to human psychology. Graphology has been used to assess compatibility of couples, intelligence and even the future (akin to astrology), especially for celebrities, politicians, etc. In the medical field, graphology has a more practical purpose, for example, to aid in diagnosis and tracking of diseases of the brain and nervous system. Courts and banks often use aspects of graphology (or more generally stroke characteristics, character tying, etc.) to authenticate or opine on authorship.

Various exemplary techniques discussed herein can generate handwriting and/or calligraphy. Such techniques allow for a broad range of user expression.

SUMMARY

An exemplary method for handwritten character generation (e.g., cursive, calligraphy or other stylized character) includes receiving one or more characters and, for the one or more received characters, generating handwritten characters using Hidden Markov Models trained for generating handwritten characters. In such a method the trained Hidden Markov Models can be adapted using a technique such as a maximum a posterior technique, a maximum likelihood linear regression technique or an Eigen-space technique.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Techniques are described herein for use in handwriting and calligraphy generation systems. Such techniques may be applied to handwriting associated with any of a variety of languages. For example, in English, various exemplary techniques can generate cursive handwriting while, in Chinese, various techniques can generate handwritten characters. In either of these examples, the style of the generated or rendered handwriting may be that of a "golden" writer, that of the particular writer or a combination of more than one writer. For the latter, a writer can choose the degree of feature similarity or adaptation between her handwriting and that of a golden writer (or a celebrity writer). Such techniques allow a writer to "forge" a golden writer's handwriting or calligraphy, to "forge" a celebrity's handwriting or calligraphy or to mix aspects of another writer's style into the writer's own handwriting or calligraphy.

Figure 1:
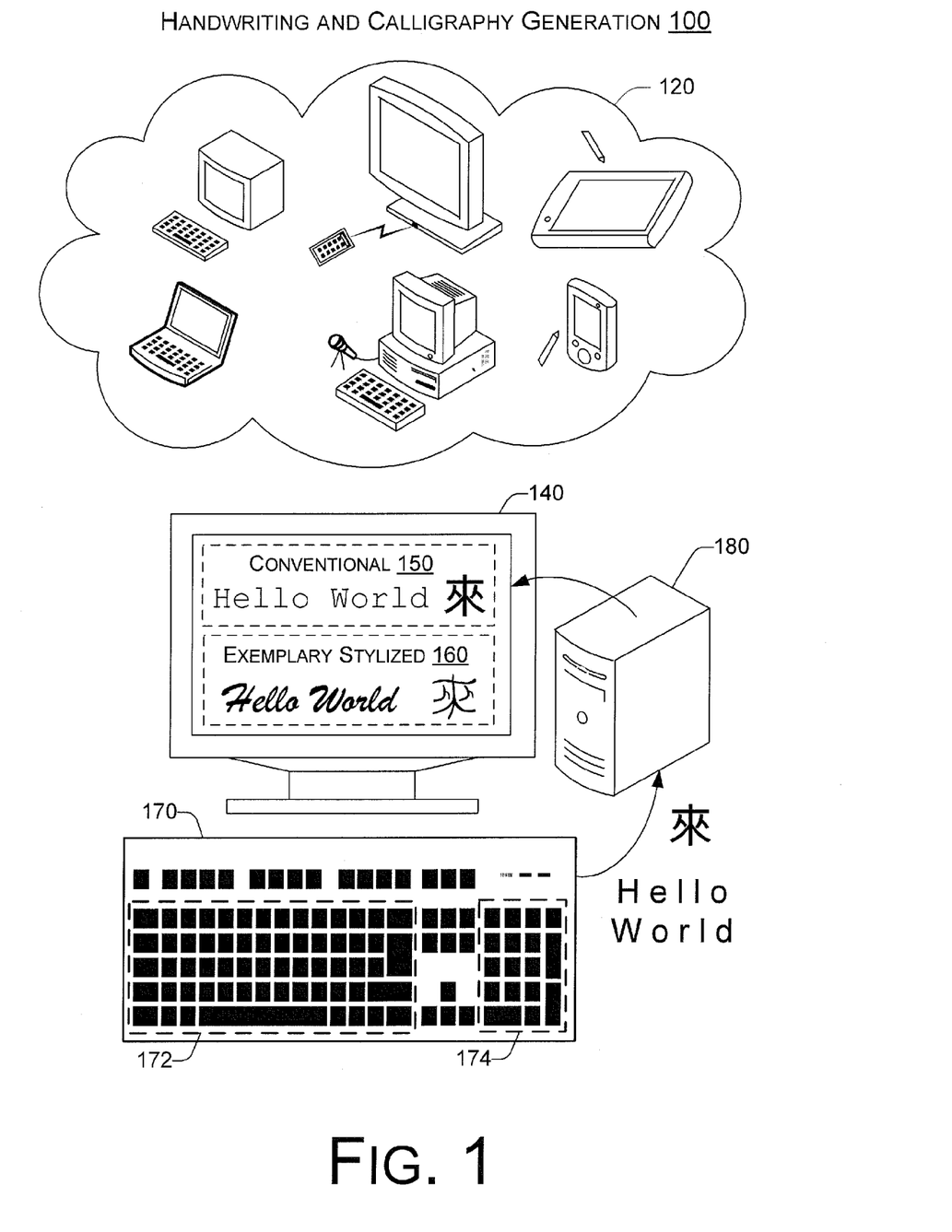
FIG. 1 is a diagram of equipment and procedures for generating handwritten characters.

FIG. 1 shows procedures and equipment for handwriting and/or calligraphy generation 100. With respect to equipment, some examples of computing devices together with a variety of input features 120. Input can occur via a keyboard, a pen, a microphone, a remote control, a cell phone keypad, etc. With respect to generation, a display 140, a keyboard 170 and a computing device 180 illustrate how a user can enter information via character keys 172 or numeric keys 174. In the example of FIG. 1, a user enters "Hello World" or an Eastern Asian character "来" using the keyboard 170. For a conventional system, the computing device 180 causes the display 140 to display a "Hello World" or "来" in a selected standard font 150. In contrast, in an exemplary handwriting generation system, the computing device 180 causes the display 140 to display a cursive "Hello World" or a calligraphic Eastern Asian character.

Various exemplary techniques described herein generate handwritten characters using a Hidden Markov Model (HMM) based approach, such as commonly used in handwriting character recognition. For example, to generate the stylized output 160, the computer 180 includes software that uses an exemplary HMM based handwriting generation approach. An exemplary method for handwritten character generation (e.g., implemented at least in part by a computing device) includes receiving a character and generating a corresponding handwritten character using HMMs trained to generate handwritten characters. Such a method may receive a string of characters or a group of characters and generate corresponding handwritten characters.

Thus, as described herein, handwritten character generation relies on an HMM based approach. Various character recognition systems use a HMM based approach to recognize characters based on a writer's input data. An individual HMM includes states and state transitions that can be trained using appropriate training information. A group of trained HMMs together with input information about a character or characters can be used to predict a probable outcome for the input information (e.g., a character or characters corresponding to the character information).

As described in more detail below, an exemplary method allows a computing device to generate handwritten characters in a natural, personalized or artistic way. As shown in the example of FIG. 1, a user can type in a message using the keyboard 170, and then the computer 180 will automatically generate pen trajectories that mimic human handwriting.

Various exemplary techniques address handwriting generation in a flexible, trainable framework. An exemplary technique models representative features (e.g., x, y coordinates of a character) together with derived features (e.g., slope and curvature). Hence, when generating a trajectory for a handwritten character, the method can solve a maximum likelihood problem that provides a smooth trajectory because not only the slope, but also the curvature is trained to be as close as possible to the corresponding models in the sense of likelihood.

Beside advantages such as flexibility, trainability and adaptability, another capability is generation of continuous handwriting, which extends beyond the traditional concept of font (see Background section). Various exemplary techniques can use pressure and speed information for defining features. With such information and features, an exemplary framework that uses a HMM based generation approach can also deal with artistic calligraphy in Eastern Asian written by brush.

Various exemplary techniques can characterize a pen trajectory using various stroke order/writing styles and imaginary strokes (or other techniques used in conventional HMM based character recognition systems). An exemplary handwritten character generation system adopts multi-path HMMs and Multi-Space Probability Distribution (MSD) to solve for stroke order/writing styles and imaginary strokes.

A conventional HMM based approach for character recognition may operate as follows. After defining features for Eastern Asian characters, defined features are extracted from training ink data to train a HMM model. The extracted features, sometimes referred to as "feature information", can be used to (i) train a character recognition model or (ii) can be input into a trained character recognition model that, in turn, outputs a character that corresponds to the feature information.

As described herein, for purposes of handwriting and/or calligraphy, an exemplary HMM based approach for generation of handwriting uses defined features to capture particularities not only associated with a character but also with stylistic nature of individual strokes in a character or a character string (e.g., a word written in cursive). The process of capturing such characteristics is referred to herein as encoding, which is part of a training process to train an exemplary HMM based system to generate handwriting and/or calligraphy.

For conventional HMM based character recognition, feature extraction is applied to ink data for a handwritten character and the resulting feature information is input to the trained HMMs. Next, the output from the trained HMMs is used to select a character that corresponds to the feature information and, indirectly, to the ink data. Accuracy of the trained HMM models depends on a variety of factors, including the selected set of online features.

As described herein, an exemplary HMM based approach for handwriting generation uses a selected set of features that is rich enough to encode handwritten characters and their associated style elements. Depending on the level of expression to be encoded or reproduced (e.g., rendered), features can allow for encoding a single character or a character string with different styles (e.g., joyful, angry, etc.).

More specifically, an exemplary method processes handwriting ink data (e.g., ink data for handwriting of a "golden" writer, an ordinary user, etc.) to provide feature information, which is then used to train a HMM based handwriting generation model. Ink data processing can include, where required, re-sampling to ensure uniform spacing of ink data points for each character stroke. Ink data processing can break ink data into frames where the frames can be analyzed with respect to a set of predetermined features. For example, a set of features can include a tangent or slope feature, a curvature feature and an imaginary stroke feature. In turn, this set of features can enhance character generation.

Features can be described with respect to rules, which may be mathematical equations. A feature may be characterized using a number (e.g., an angle, a length, etc.), numbers (e.g., coordinates, etc.) or other representation. A relationship may exist between features where such a relationship may be quantified for purposes of character encoding and/or style encoding. Extracted features of ink data may be represented in the form of a vector or array, for example, as suitable input for training a HMM based handwriting generation system.

A features based approach allows ink data to be reduced in a manner that focuses on preserving characteristics that enhance or otherwise facilitate handwriting generation while still preserving desirable style characteristics. Feature extraction can also act to eliminate data or characteristics that are irrelevant or diminish recognition accuracy.

Character Features and Modeling Features

Figure 2:
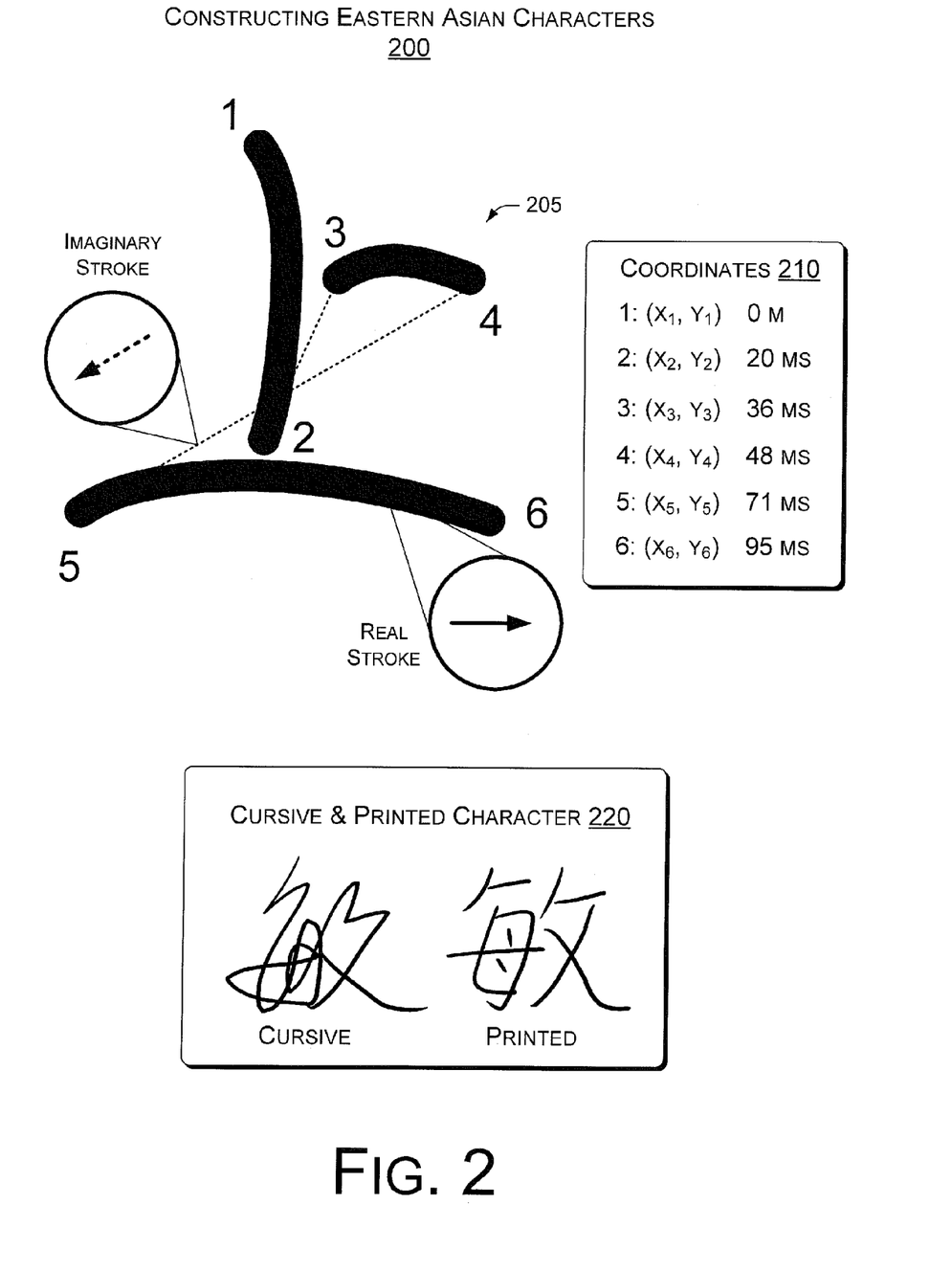
FIG. 2 is a diagram of an Eastern Asian (EA) character along with indications of strokes, order of strokes and cursive and printed representations of an EA character; noting that various exemplary method can be used with characters from other languages (e.g., cursive English, etc.).

FIG. 2 shows a diagram 200 of an Eastern Asian (EA) character 205 along with indications of strokes and timings 210 for beginning and end points (1-6) of each stroke. A cursive and printed character 220 are also shown. As indicated with respect to the character 205, a stroke may be a real stroke (e.g., an ink stroke) or an imaginary stroke. Beginning and end points of individual strokes are labeled from 1 to 6, according to an order in which an individual drew the character. Timings 110 in milliseconds are shown for each of the points 1 through 6 along with Cartesian coordinates (x, y). In this example, a writer started a first real stroke at point 1, which is accorded a time of 0 ms, and ended the first stroke at point 2 at a time of 20 ms. A second real stroke commenced at point 3 at a time of 36 ms and ended at point 4 at a time of 48 ms. A final real stroke commenced at point 5 at a time of 71 ms and ended at point 6 at a time of 95 ms. Where a sampling rate of 100 Hz is used, the smallest time increment would be 10 ms, hence, the time information may be rounded (e.g., 0 ms, 20 ms, 40 ms, 50 ms, 70 ms, 100 ms). Time sequential information allows for speed, velocity and acceleration determinations for a stroke.

Various techniques described herein can be used with online handwriting ink data or offline handwriting ink to train or adapt a HMM based generation system. Offline handwriting data is usually converted into an image that lacks temporal information whereas online handwriting data may be collected a tablet device that samples a series points for a pen tip trajectory. However, offline handwriting data may be generated in a manner that preserves temporal information (e.g., speed, velocity, acceleration, etc.) and/or other information (e.g., pressure, brush thickness, etc.).

While the timings 210 of FIG. 2 only show Cartesian coordinates and a time stamp, handwriting ink data may include other information. For calligraphy, brush information or other calligraphy related information may be included in handwriting data. Handwriting data can include information as to writing order of several strokes such as the sequential points 1 through 6 that correspond to three stokes of a character. As described further below, a HMM based model can include paths that represent different stroke orders for a group of strokes, which, in turn, can account for handwriting style. In general, a predetermined set of features captures particular types of handwriting information to preserve style characteristics.

Devices configured to record handwriting typically rely on interaction between a writing implement (e.g., a pen) and a recording surface (see, e.g., the devices 110 of FIG. 1). When forming a character, each ink stroke may be recorded as a sequence of sampling points evoked by a pen tip's touch on a tablet, which represents the pen tip's trajectory between pen down and pen up. A user may also lift the writing implement between strokes such that movement of the implement is not recorded, however, movements not associated with ink strokes may be considered trivial compared to movements for ink strokes. More generally, a handwritten character has one or more ink strokes, which are not continuous in coordinates.

For Eastern Asian characters, a user may write a character in a printed style, a running style or a cursive style. Such styles may be written consistently with a fixed number of strokes or a variable number of strokes. For example, consider the cursive and printed versions of the character 220. In a printed style, characters are written more regularly (e.g., like a printed font) and the boundary between two strokes tends to be quite distinctive; while in a running or cursive style, successive strokes tend to be connected together and the boundary between successive strokes are vague. More specifically, in cursive Eastern Asian character writing, a user tends to connect several part of a character into one part by writing it with only a single stroke, noting that a user may use more than one stroke for the entire character. In contrast, for printing Eastern Asian characters, a user's stroke number for a character is usually quite stable. Inconsistencies that arise in cursive writing or printed writing may be considered style characteristics that may be accounted for when modeling style. Conventional character recognition systems treat such inconsistencies as problematic and use techniques to reduce their effect when building a HMM model for character recognition. Such a conventional approach diminishes the ability to model style.

Referring again to the character 205 of FIG. 2, an exemplary character generation system can identify one or more imaginary strokes to facilitate modeling for character generation in a manner that accounts for style of a writer's handwriting and/or calligraphy. For example, an imaginary stroke can be defined as an imaginary linear movement of a pen from a previous stroke's pen up to the next stroke's pen down. With imaginary strokes between neighboring real strokes, all strokes are connected to form a continuous trajectory, on which a HMM can be built to model a handwritten character for purposes of handwriting generation.

Figure 3:
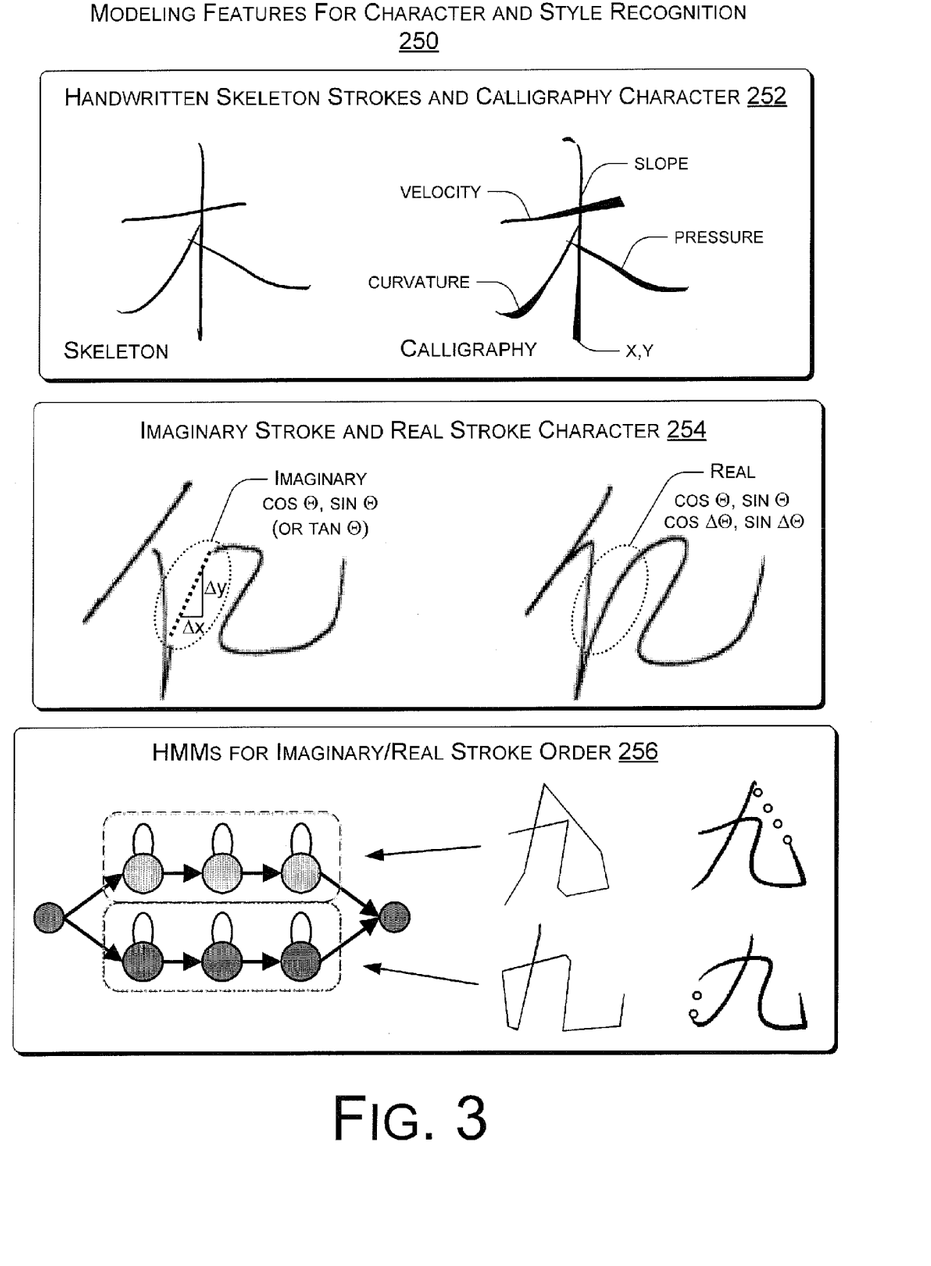
FIG. 3 is a diagram of various modeling features for character and style modeling.

FIG. 3 shows various modeling features for character and style encoding 250, for example, for modeling Eastern Asian characters or other handwritten characters. A handwritten skeleton stroke character and a calligraphy character 252 demonstrate differences between styles as well as elements of style. The skeleton stroke character can be fairly well represented using a standard feature set (e.g., x-y coordinates), however, the calligraphy character includes more style elements (e.g., personal, non-standard characteristics, which may vary by mood, emotional state, etc.). Calligraphy or expressive strokes are also referred to herein as "rich strokes" as they include more information than skeleton strokes. An exemplary feature set can include features pertaining to pressure, velocity (and/or speed), slope (or tangent) and/or curvature to account for style elements found in rich strokes.

Another block in FIG. 3 shows an example of a character with an imaginary stroke and an example of the same character with a real stroke 254. As described herein, imaginary strokes can be represented using fewer dimensions than real strokes. Specifically, in the example the imaginary stroke is represented as a straight dashed line with slope but without curvature, as indicated by the $\Delta x$ and $\Delta y$ distances and the cosine and sine function (or by a tangent function). In contrast to the imaginary stroke, the real stroke is not straight but curved; thus, the features $\cos \Delta\Theta$ and $\sin \Delta\Theta$ may be used in addition to the slope features for a real stroke, whether the real stroke is a fundamental part of a character (e.g., skeletal component), a connecting stroke (e.g., cursive) or a style element (e.g., calligraphic element). As described herein, for a handwriting generation system, slope features can be estimated for imaginary strokes while slope and curvature features can be estimated for real strokes.

Identification of imaginary strokes via an imaginary stroke feature can assist in encoding and training as well as style generation. Further, while the portion of the character with the real stroke may be labeled or identified as having little or no relevance to character recognition, it may also be identified as an "imaginary" stroke portion (or cursive connecting portion or style portion) and used for purposes of handwriting generation.

As described herein, imaginary strokes can be generated by connecting adjacent real strokes together to form a continuous trajectory. For example, ink data can be transformed (e.g., resampled) to a continuous set of data with equal increments between data points. For a handwritten Eastern Asian character, the ink data can be represented as a single continuous trajectory with portions marked as imaginary or real, as appropriate. For a handwritten, cursive English character (or characters) a single continuous trajectory may be used as well where connection portions to connect characters in cursive script are appropriately marked.

The aforementioned continuous trajectory approach can, in some instances, cause confusion among characters with similar but actually different trajectories. To overcome such issues, an exemplary Multi-Space Probability Distribution (MSD) technique can be implemented to model imaginary strokes jointly with real strokes. For example, considering the two Chinese radicals '氵(water)' and 'ì(speech)', if all real strokes are connected, the trajectories of the two radicals then become indistinguishable. In addition to the pen trajectory, a binary indicator to encode connection/no-connection between successive real strokes can be useful to differentiate real from imaginary strokes. As already mentioned with respect to the character 254, another issue in imaginary stroke modeling occurs for direct connection of two successive real strokes where features like curvatures are degenerated (such imaginary strokes have zero variance).

Using the MSD technique, real and imaginary strokes become observations from different probability spaces that can be modeled stochastically. Also, the flexibility in the MSD technique, to assign different feature dimensions to each individual space, allows a recognition system to ignore certain features that can cause singularity issues in modeling. For purposes of character recognition, experimental results obtained in handwritten Chinese character recognition indicate that the MSD approach provides about a 1.3%-2.8% character recognition accuracy improvement across different recognition systems where MSD significantly improves discrimination among confusable characters with similar trajectories (e.g., 清 versus and 请). As described herein, such an approach is applied to an HMM based model for handwriting generation.

For HMM based models, exemplary structures for handling imaginary and real strokes can include a state ("State A") approach that has one data stream with two probability density functions (PDFs) (a 4-dimensional Gaussian PDF models a real stroke feature and a 2-dimensional Gaussian PDF models an imaginary stroke feature) and a state ("State B") approach that has two streams with one stream modeled by a 2-dimensional Gaussian function and the other being a MSD stream which has two PDFs: a 2-dimensional Gaussian PDF to model a real stroke feature and a 0-dimensional PDF whose probability is constantly 1. For State B, the probability of a state is the summation of these two streams output probabilities.

The physical meaning of a real probability (RP) for a stroke is the probability that the stroke was written in a pen-down phase or a real stroke. For those states that correspond to real strokes in printed fonts, RP should be close to 1. For those states that correspond to imaginary strokes, an imaginary probability (PI) is between 0 and 1, depending upon how likely the samples in the training or input data are connected.

By adding imaginary strokes and appropriate MSD modeling, discrimination among characters of similar trajectories is enhanced. For example, in traditional HMM approaches, discrimination among the radicals of '冫', 'ì' and '忄' can lack accuracy while with a MSD-HMM approach, discrimination is more accurate. The overall improvement achieved by using a MSD-HMM approach is effective in alleviating issues caused by simply connecting real strokes with imaginary ones.

As already mentioned, an exemplary HMM based approach can use slope and curvature features. More specifically, the slope features (cos Θ; sin Θ) and curvature (cos ΔΘ, sin ΔΘ) features allow modeling of characters and style. While sine and cosine are used in various examples, other representations of slope and curvature may be used as alternatives (e.g., tangent, etc.). The slope features can be measured on imaginary strokes, but for the curvature features, due to the direct connection of two successive real strokes, curvature of an imaginary stroke is intrinsically zero, which yields a singularity in HMM modeling. To overcome this, in MSD-HMM, for real strokes, a four dimensional feature set (cos Θ; sin Θ; cos ΔΘ; sin ΔΘ) is used while for imaginary strokes a two dimensional feature set (cos Θ; sin Θ) is used. This approach eliminates the possibility of a curvature singularity for imaginary strokes while preserving rich stroke information for real strokes. In other words, via this feature arrangement, non-stochastic, degenerated information of curvature information in imaginary strokes is discarded, and pen trajectories are modeled efficiently.

An exemplary HMM based modeling approach uses slope features and curvature features to determine the original coordinates, which are the representative features. While it is not specifically stated which part is determined by slope and which part is determined by curvature, the final result is a maximum likelihood solution (ML solution) in the sense of not only slope, but also curvature. The MSD technique is added to a HMM based model to determine whether a stroke is real or imaginary, for example, using a "realness" weight or probability in a MSD-HMM model. The aforementioned real probability (RP) and imaginary probability (IP) correspond to this weight. While such a weight can be a continuous value, it can also be treated more approximately (e.g., those values less than 0.5 can be set to a weight of 0 and those values larger than 0.5 can be set to a weight of 1).

FIG. 3 also shows a diagram for HMMs corresponding to imaginary/real stroke order 256. At the right side of the diagram 256, open circles represent two possible imaginary strokes for a character. Whether a handwritten character is written in one manner or the other is captured via ink sequence data. As explained with respect to the character 250, a writer may write a character using a standard order (e.g., as taught in school) or an alternative order (e.g., personal or other). To capture such information, which can help to generate handwriting, an exemplary HMM based handwriting generation system includes HMMs for both possibilities. Of course where more than two possibilities exist, a generation system can include more than two possibilities.

The approach illustrated in the HMMs 256 is referred to as a multi-path approach. In conventional online handwriting modeling, the HMM topology is left-to-right, and only capable of characterizing a specific kind of pen trajectory. An exemplary multi-path HMM approach accounts for variances in writing orders and writing styles. As explained further below, an exemplary method includes training multi-path HMMs for a unit of variant writing orders and writing styles.

As already mentioned, for the HMMs 256, each single transition path models a certain writing order or writing styles. The exemplary multi-path topology also enables automatic training of all paths without separating the data into different training groups of writing orders and writing styles. In the example of FIG. 3, each trained path represents a primary writing pattern of the character, which can be one writing stroke-order or one writing style. The pattern that each path represents is automatically trained from the data. For example, the Chinese character "九" usually can be written in two stroke-orders. From the diagram 256, each path of the trained 2-path model for this character represents one writing stroke-order (in model visualization, each line represents one state model). Also, for the Chinese character "复", while it usually has only one writing stroke-order, it can be written in different styles (e.g., regular and cursive).

Exemplary Handwriting and/or Calligraphy Generation Systems and Methods

Once a set of features and modeling approaches to handle such features have been selected, an HMM based model can be trained and then used to generation handwritten characters along with their style elements. Further, as described herein, a HMM based model can be adapted using a writer's own handwriting or otherwise "personalized" to introduce particular style elements. Adaptation is optional and the extent of adaptation can vary according to a writer's desires (e.g., from nearly no personalization to highly personalized).

Figure 4:
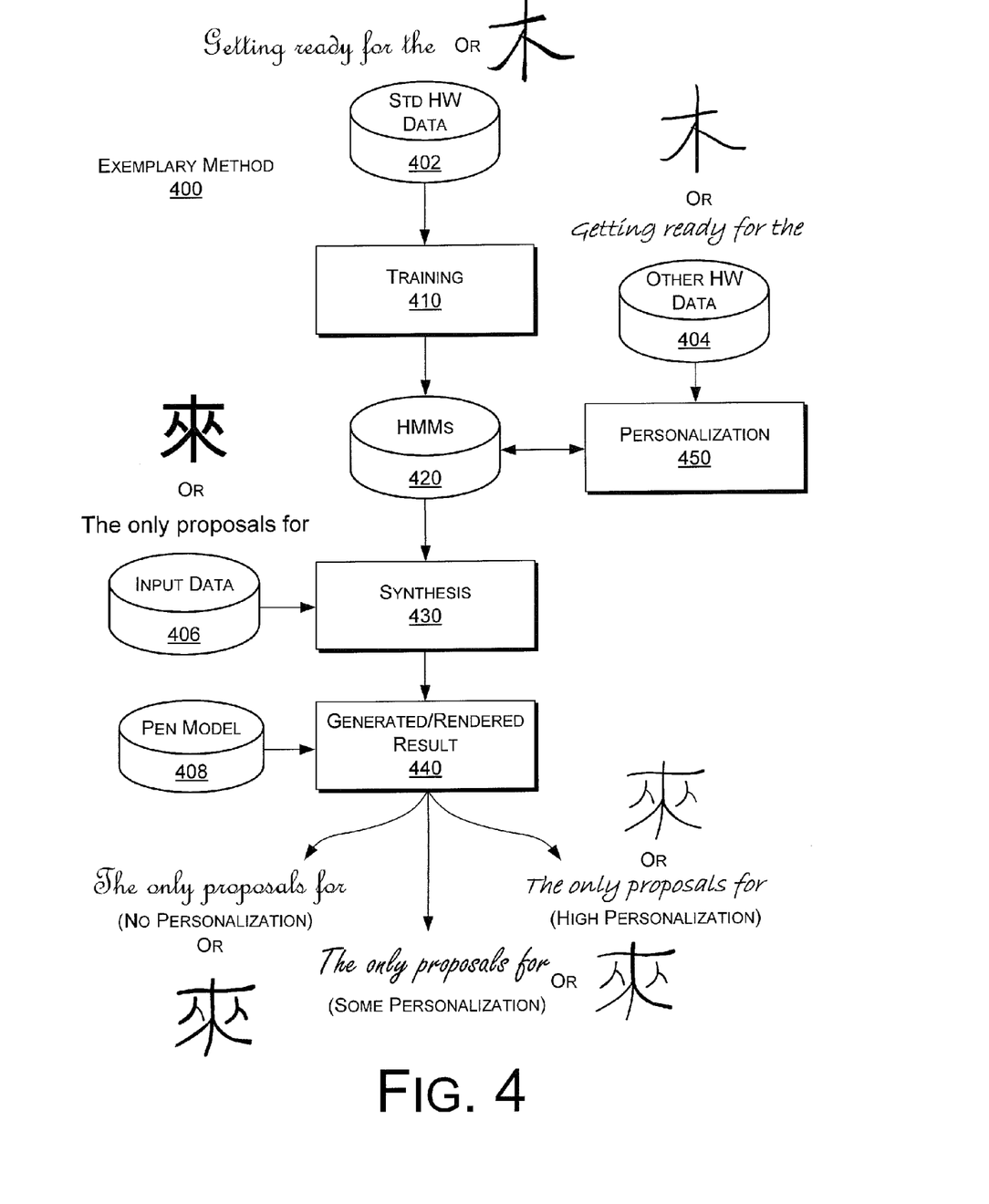
FIG. 4 is a diagram of an exemplary method for handwritten character generation using a HMM based model along with a personalization option.

FIG. 4 shows an exemplary method 400 for handwriting generation and rendering. The method 400 operates on several sources of data: standard handwriting data 402 (e.g., "golden" writer); other handwriting data 404 (e.g., personal writer); input "label" data 406 (e.g., via a keyboard, etc.); and pen model or data 408 (e.g., calligraphy brush, pen tip, etc.). The various fonts used in FIG. 4 are for purposes of illustration only, actual handwriting can include richer strokes and stroke variability, as explained with respect to the characters of FIGS. 2 and 3. The method 400 may be optionally personalized by a personalization or adaptation block 450 (e.g., using data 404). The method 400 is first described generally without the personalization option and then more specifically with the personalization option.

According to the method 400, the standard data 402 is input to a training block 410 that trains a HMM model to generate a trained HMM model, which includes a collection of trained HMMs 420. In this example, the HMMs 420 model slope, curvature, imaginary stroke features of the standard data 402. As explained with respect to FIG. 5, the HMM model may be a MSD-HMM model where a MSD technique applies to modeling of real and imaginary strokes.

Given the trained HMMs 420, handwriting generation can occur in a synthesis block 430 that receives the input data 406 from a particular "writer", which as explained with respect to FIG. 1, may come from any of a variety of sources (e.g., keypad, keyboard, voice recognition, character recognition, etc.). The synthesis block 430 produces a generated result 440, which may be rendered according to a pen model 408. Where the personalization option is not implemented, the result 440 is a non-personalized result (left side) that, depending on the rendering (e.g., pen model), can mimic or reproduce the standard handwriting data 402 style. For example, where the standard handwriting data 402 corresponds to a "golden" writer then the rendered result can be a reproduction of the golden writer's style, even though it was simply an ordinary user that input the data 406 (e.g., as input via a keypad, keyboard, etc.).

The personalization option 450 can adapt the style of the standard handwriting data 402 with the style of other handwriting data 404. The data 404 may be from a user or another. Where the data 404 is from a user, the personalization block 450 can adapt the style of the standard handwriting data 402 such that the result 440 is a mix of the standard style and the writer's own style. Where the data 404 is from another, for example, the standard handwriting data 402 may be from a celebrity such as Angelina Jolie and the other handwriting data 404 may be from another celebrity such as Brad Pitt. In turn, the input data 406 may be from an ordinary writer that wants her handwriting to look like a mix between Angelina Jolie and Brad Pitt (i.e., "brangelina").

Figure 6:
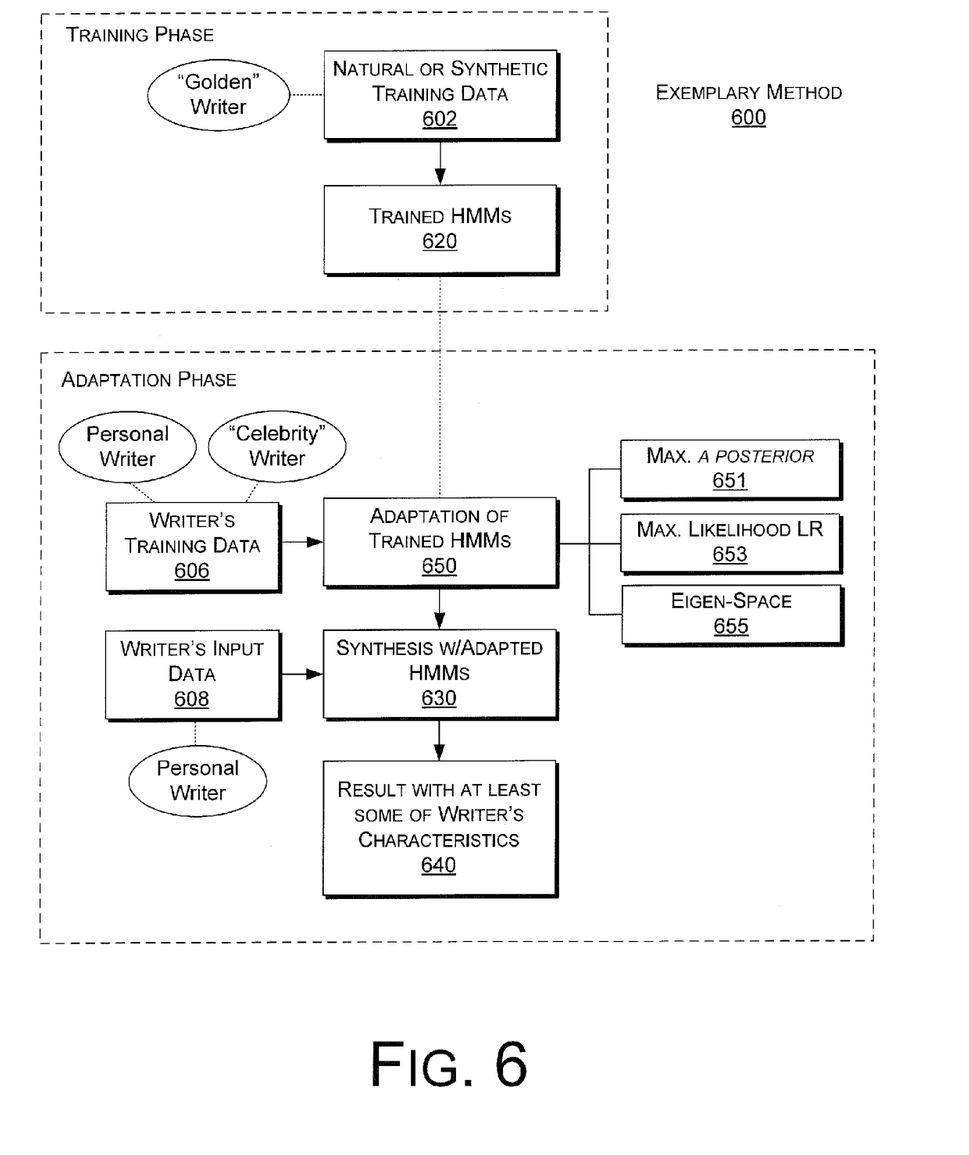
FIG. 6 is a diagram of an exemplary method for adapting trained HMMs using one or more adaptation techniques.
Figure 7:
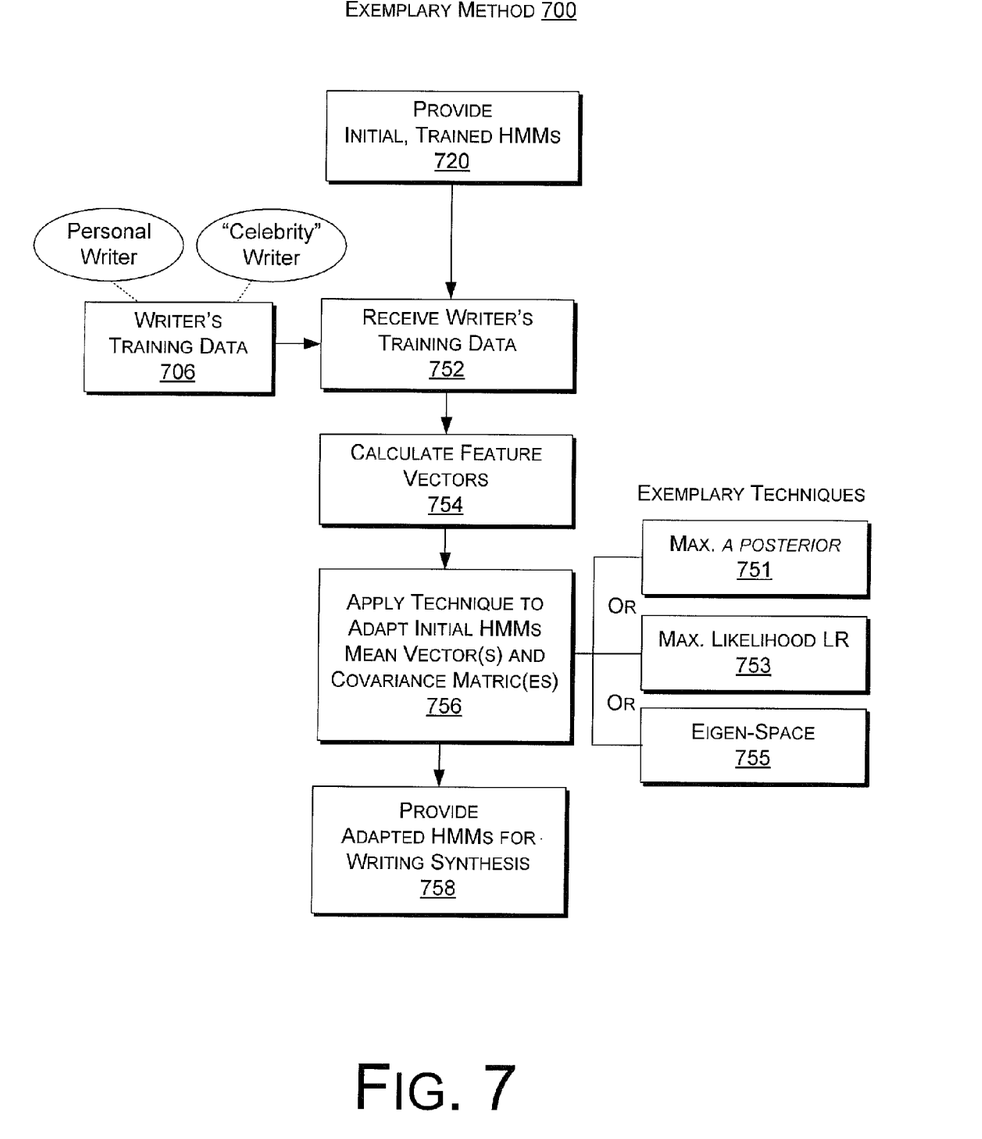
FIG. 7 is a diagram of an exemplary method for adapting initial, trained HMMs by applying an adaptation technique to one or more mean vectors and one or more covariance matrices.

Adaptation techniques are discussed in more detail with respect to FIGS. 6 and 7; noting that a user may determine how much adaptation occurs. As indicated at the bottom of FIG. 4, a rendered result 440 may have no personalization, some personalization or be highly personalized.

Figure 5:
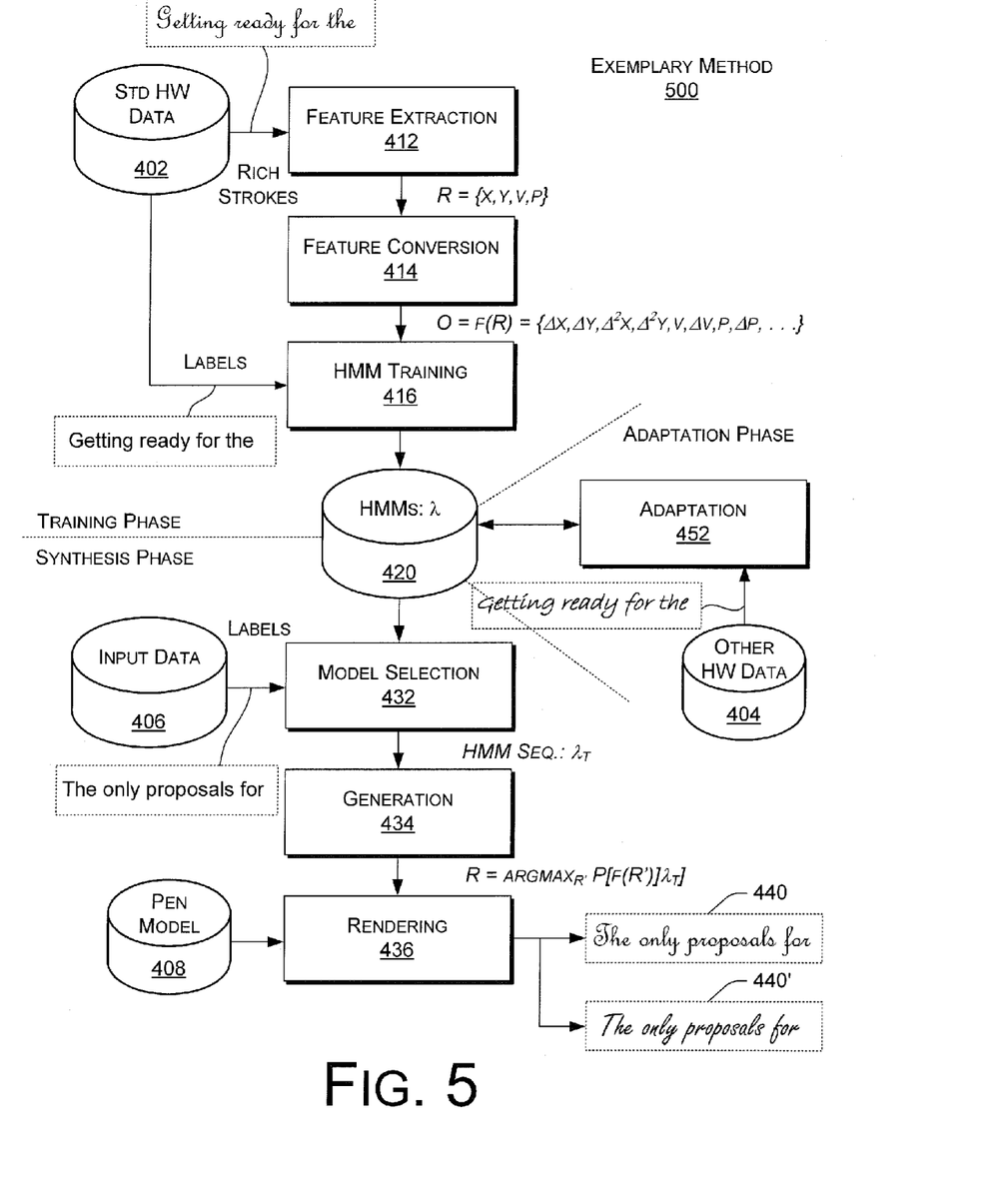
FIG. 5 is a diagram of an exemplary method for handwritten character generation that includes a training phase and a synthesis phase along with an exemplary feature vector and solution technique.

FIG. 5 shows an exemplary method 500 that includes the training phase 410 and the synthesis phase 430 of FIG. 4 as well as other details. In general, the training phase 410 trains HMMs with a modeling feature vector, which is a function of the original representative feature vector, to learn more detail information of a trajectory and a synthesis phase 430 includes solving a generation problem by maximizing the likelihood with respect to the representative feature vector by explicitly imposing the relative between modeling feature vector and representative feature vector. For example, in speech synthesis, the representative feature vector consists of spectrum envelope parameters and fundamental frequency, and their delta and acceleration is appended for a modeling feature vector. In the training phase 410, HMMs are trained using all the modeling features and then in the synthesis phase 430, spectrum parameters and fundamental frequency trajectories with the largest likelihood are generated as the output.

As described herein HMM based modeling for handwriting and/or calligraphy provides an open solution in that all kinds of features can be easily used, which is helpful especially in artistic calligraphy synthesis. Such an approach can build a personalized handwritten font with only a few adaptation samples by using HMM adaptation technologies. An exemplary HMM based approach allows for connection morphing of unseen character combinations in training data, which can be naturally generated by decision tree or other clustering technologies widely adopted in speech recognition and synthesis, which endows such a system with better generalization or creation ability.

Referring again to the method 500 of FIG. 5, the data blocks 402, 405, 406 and 408 are as described in FIG. 4. While the data block 402 may be from a standard writer (i.e., a golden writer), it may also be a collection of data from more than one writer (e.g., many writers) to train an average font.

The training phase 410 can receive standard handwriting data 402 and analyze such data to identify rich strokes and labels. The rich strokes are input to a feature extraction block 412 that extracts features such as x-y coordinates, velocity and pressure as indicated by the representative features vector R={x, y, v, p}. A feature conversion block 414 converts the features into a more meaningful vector that is a function of the basic features, as indicated by $O=f(R)=\{\Delta x, \Delta y, \Delta^2 x, \Delta^2 y, v, \Delta v, p, \Delta p, \ldots\}$. This information is then input to a HMM training block 416 together with the corresponding labels to produce trained HMMs 420.

As in speech synthesis, high-order dynamic features are helpful in describing smoothing-evolving trajectories. Thus, per the feature extraction block 412 and the feature conversion block 414, to generate the trajectories of representative features R={x, y, v, p}, the approach adopts modeling features of $O=\{\Delta x, \Delta y, \Delta^2 x, \Delta^2 y, v, \Delta v, p, \Delta p\}$. In this example, the static features of x and y themselves are not included because it is usually not trivial to well normalize them. In some cases where they can be normalized, they can also be used.

As already discussed, for imaginary and real strokes, the dimension of imaginary space is lower than that of real space. For example, an approach adopts $(\Delta x, \Delta y, \Delta^2 x, \Delta^2 y)$ as the features in real space, then the features in imaginary space is ($\Delta x$, $\Delta y$) because the accelerations (curvature) are by definition always 0 on imaginary strokes.

An adaptation block 452 can adapt the trained HMMs 420 using other handwriting data 404. Again, adaptation or personalization is optional and may be selected by a user to adapt or personalize a standard handwriting or calligraphy style.

In the synthesis phase 430, input data 406 labels are input to a model selection block 432 that selects a HMM sequence. A generation block 434 follows that determines the "best fit" HMMs using a maximum likelihood approach, as indicated by the function: $R = \text{argmax}_{R'} P[f(R')]\lambda_T]$. Thus, in the synthesis phase 430, given a piece of text (e.g., "hello world" example of FIG. 1), the corresponding model sequences is first selected from the trained and optionally adapted HMMs 420 per the selection block 432 and, per the generation block 434, the maximum likelihood solution with respect to representative feature vectors is obtained and used in a rendering block 436 to produce a rendered result 440 or an adapted or personalized rendered result 440'.

FIG. 6 shows an exemplary method 600 for adapting trained HMMs. As already described, a training phase can use data from a golden writer, which may be nature or synthetic training data 602 to produce trained HMMs 620. Given trained HMMs 620, adaptation can occur.

An adaptation block 650 receives as input a writer's training data 606, which may be from a personal writer, a celebrity writer, etc. Adaptation of the trained HMMs 620 occurs using one or more techniques. For example, a maximum a posterior (MAP) 651, a maximum likelihood linear regression (MLLR) 653 or an Eigen-space (ES) 655 technique may be used for purposes of adaptation of the trained HMMs 620.

After adaptation block 650, a synthesis block 630 receives a writer's input data 608 (e.g., keyboard entered characters) and then generates a result 640 with at least some of the writer's characteristics per the writer's training data 606.

FIG. 7 shows an exemplary method 700 for adapting trained HMMs. The method 700 commences in a provision block 720 that provides initial, trained HMMs. A reception block 752 receives the writer's training data 706, for purposes of adaptation. A calculation block 754 calculates feature vectors for the writer's training data. Next, a technique (e.g., MAP 751, MLLR 753 or ES 755) is selected and applied per block 756 to adapt the initial, trained HMMs mean vector(s) and covariance matrix(ces). Once adapted, a provision block 758 provides the adapted HMMs for writing synthesis.

EXAMPLES

Figure 8:
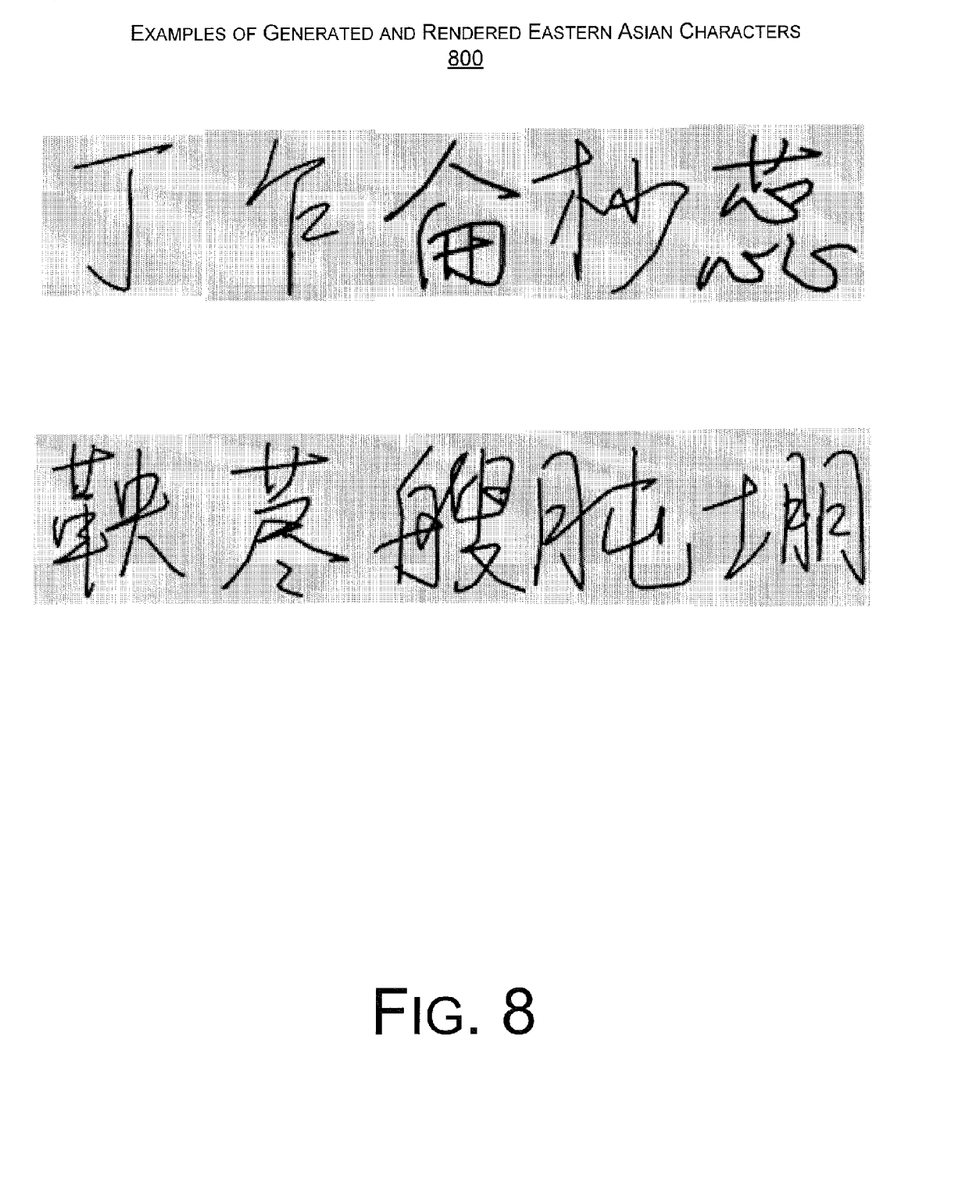
FIG. 8 is a diagram of various handwritten EA characters generated and rendered using an exemplary system that uses slope, curvature and imaginary stroke features.

FIG. 8 shows some examples of generated and rendered handwritten Eastern Asian characters 800. The examples demonstrate training and generating skeleton features represented by the vector $R = \{x, y\}$ using a Chinese handwriting database where modeling features include slope and curvature $O = \{\Delta x, \Delta y, \Delta^2 x, \Delta^2 y\}$. In these examples, single path MSD HMMs were used to model each character. An automatically generated text line of "(average font)" is shown in these examples. As explained with respect to FIGS. 4 and 5, a pen model or other rendering technique may be used to render a character having characteristics of a particular brush, pen tip, etc.

While Eastern Asian characters are shown in FIG. 8, various exemplary techniques can be used for characters of other languages. For example, various exemplary techniques allow for generation of cursive English handwriting. Such continuous generation may occur in a relatively real-time basis where handwriting is generated and transmitted to a remote location or rendered locally. For example, a user may enter a text message on a cell phone and the generated handwriting may appear rendered at a remote location. In such an example, the generation may occur on one computing device and the rendering at another. Or the generation and rendering may occur at a remote computing device (e.g., text sent to remote device for generation of handwriting and rendering). Generation and/or rendering may occur based on an identified sender of a text message (e.g., friend 2 likes celebrity X, so generate/render friend 2's text messages in celebrity X's handwriting).

An exemplary computing device for handwriting and/or calligraphy generation can include a processor, a user input mechanism, a display and control logic implemented at least in part by the processor to generate a handwritten character based on generation algorithm that uses Hidden Markov Models (HMM) and a Multi-Space Probability Distribution (MSD) technique and features extracted from handwritten character ink data wherein the extracted features comprise a real stroke feature set and a lesser dimension imaginary feature set.

Such a computing device can include control logic to uniformly sample the ink data and to generate ink data frames of uniform length, control logic to generate a series of contiguous ink data frames from the character ink data where the series of ink data frames includes real stroke frames and imaginary stroke frames, control logic to generate ink data frames from the character ink data and to determine, for a x,y Cartesian coordinate system, a $\Delta x$ value and a $\Delta y$ value for each ink data frame, control logic to generate ink data frames from the character ink data and to determine a sine value and a cosine value (e.g., for a frame or for an angle between two adjacent ink data frames). An exemplary computing device for generation of handwriting using a trained HMM based approach may be a cellular phone or other handheld computing device (e.g., a PDA, etc.).

Exemplary Computing Device

Figure 9:
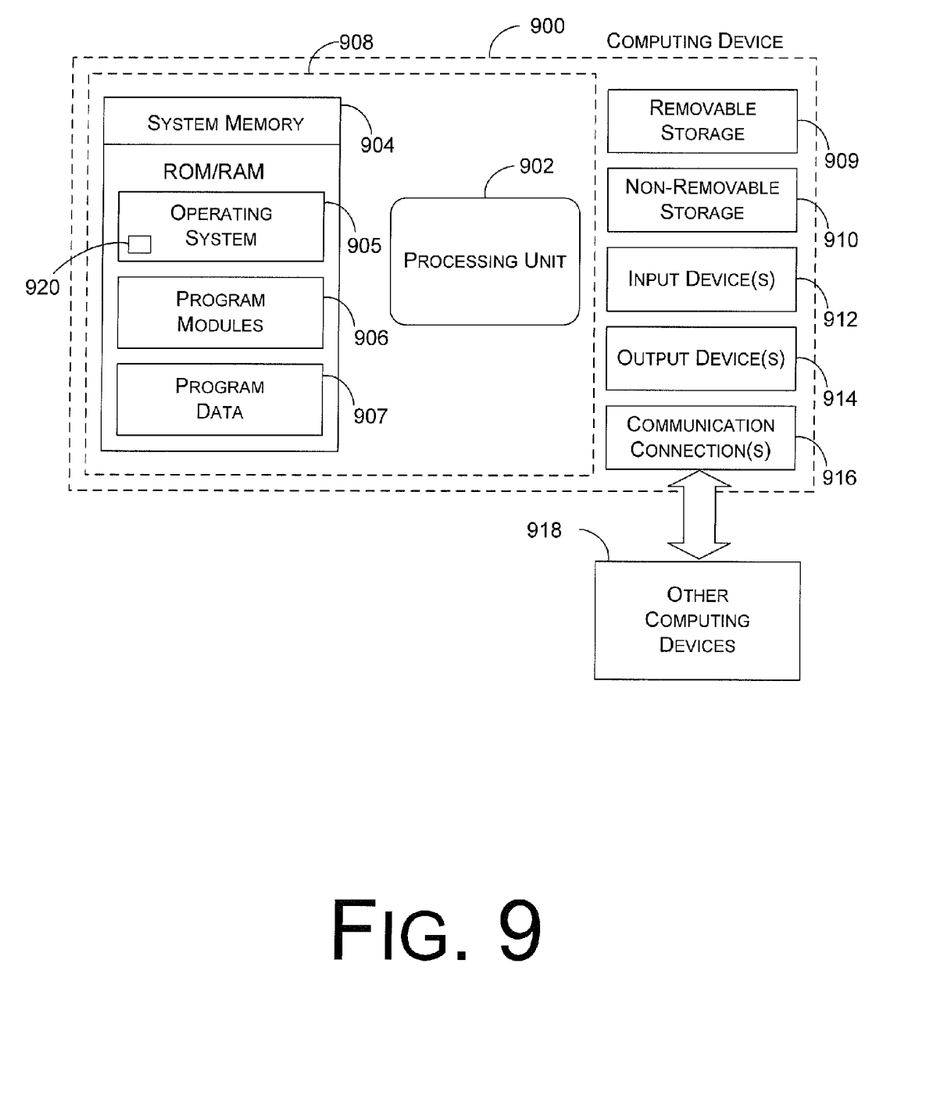
FIG. 9 is a diagram of various components of an exemplary computing device that may be used to implement part or all of various exemplary methods discussed herein.

FIG. 9 shows various components of an exemplary computing device 900 that may be used to implement part or all of various exemplary methods discussed herein.

The computing device shown in FIG. 9 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 9, an exemplary system for implementing an exemplary character generation system that uses a features-based approach to conditioning ink data includes a computing device, such as computing device 900. In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more program modules 906, and may include program data 907. This basic configuration is illustrated in FIG. 9 by those components within dashed line 908.

The operating system 905 may include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well know in the art and need not be discussed at length here.

Computing device 900 may also contain communication connections 916 that allow the device to communicate with other computing devices 918, such as over a network. Communication connection(s) 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

An exemplary computing device may include a processor, a user input mechanism (e.g., a mouse, a stylus, a scroll pad, etc.), a display and control logic implemented at least in part by the processor to train and/or to generate handwriting based on a handwriting generation algorithm that uses a Hidden Markov Model (HMM) and a features-based approach to extract information from time sequential ink data. For generation and/or rendering, such a device may be a cellular telephone or generally a handheld computer.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

What is claimed is:

1. A method for handwritten character generation, implemented at least in part by a computing device, the method comprising:
receiving a character; and
generating a corresponding handwritten character using Hidden Markov Models trained to generate handwritten characters, the generating including using a Multi-Space Probability Distribution technique that includes a probability for determining whether a stroke is real or imaginary.

2. The method of claim 1, further comprising receiving more than one character and generating corresponding handwritten characters.

3. The method of claim 1, wherein the Hidden Markov Models comprise Hidden Markov Models trained using slope, curvature and imaginary stroke features.

4. The method of claim 1 wherein the Hidden Markov Models comprise Hidden Markov Models trained using a real stroke feature set that includes a slope feature, a curvature feature and an imaginary stroke feature set of a lesser dimension that includes a second slope feature.

5. The method of claim 1, wherein the Hidden Markov Models comprise Hidden Markov Models trained using calligraphy data.

6. The method of claim 1, wherein the Hidden Markov Models comprise Hidden Markov Models trained using Eastern Asian character data.

7. The method of claim 1, wherein the Hidden Markov Models comprise Hidden Markov Models trained using data from a standard writer.

8. The method of claim 1, further comprising rendering the generated corresponding handwritten character using a pen model.

9. The method of claim 8, wherein the pen model comprises pen tip parameters.

10. The method of claim 1, wherein the Hidden Markov Models comprise Hidden Markov Models trained using a pressure feature that corresponds to writing pressure.

11. The method of claim 1, wherein the Hidden Markov Models comprise trained Hidden Markov Models, that are adapted using a technique selected from a group of maximum a posteriori techniques, maximum likelihood linear regression techniques and Eigen-space techniques.

12. The method of claim 1, wherein the Hidden Markov Models comprise trained Hidden Markov Models, that are adapted using a maximum likelihood linear regression technique and ink data from a writer that produced the received character.

13. The method of claim 1, wherein the trained Hidden Markov Models comprise trained Hidden Markov Models, that are adapted using an adaptation technique and ink data from a celebrity.

14. A method for adapting trained Hidden Markov Models for generation of handwritten characters, implemented at least in part by a computing device, the method comprising:
   providing initial, trained Hidden Markov Models for generation of handwritten characters;
   providing training ink data to adapt the initial, trained Hidden Markov Models;
   applying an adaptation technique to adapt the initial, trained Hidden Markov Models to the training ink data, the adaptation technique including a technique selected from a group of maximum a posterior techniques, maximum likelihood linear regression techniques and Eigenspace techniques; and
   rendering the generated handwritten characters using a pen model, the pen model including a plurality of pen parameters.

15. The method of claim 14, further comprising calculating feature vectors for the training ink data.

16. The method of claim 14, wherein the applying applies the selected technique to one or more mean vectors and one or more covariance matrix(ces).

17. The method of claim 14, wherein the initial, trained Hidden Markov Models comprise Hidden Markov Models trained using calligraphy data.

18. The method of claim 14, wherein:
   the initial, trained Hidden Markov Models comprise Hidden Markov Models trained using a standard writer; and
   the training ink data comprises data from a different writer.

19. A computing device for generating handwritten characters, the device comprising:
   a processor;
   a user input mechanism;
   a display;
   control logic implemented at least in part by the processor to generate handwritten characters based on an algorithm that uses Hidden Markov Models; and
   a pen model implemented at least in part by the processor to render the generated handwritten characters based at least in part on a probability for determining whether a particular stroke is real or imaginary, the pen model comprising pen parameters.

* * * * *

UNITED STATES PATENT AND TRADEMARK OFFICE
CERTIFICATE OF CORRECTION

| | | |
|---|---|---|
| PATENT NO. | : 7,983,478 B2 | Page 1 of 1 |
| APPLICATION NO. | : 11/837434 | |
| DATED | : July 19, 2011 | |
| INVENTOR(S) | : Peng Liu et al. | |

It is certified that error appears in the above-identified patent and that said Letters Patent is hereby corrected as shown below:

On the Title Page, change

Column 1, line 75, change "Frank Kao-PingK Soong" to

-- Frank Kao-Ping K. Soong --.

Signed and Sealed this
Sixth Day of March, 2012

David J. Kappos
*Director of the United States Patent and Trademark Office*